(12) United States Patent
Randell

(10) Patent No.: US 6,276,674 B1
(45) Date of Patent: Aug. 21, 2001

(54) REINFORCED ELASTOMERIC SPRING

(75) Inventor: William Francis Randell, Turnby (GB)

(73) Assignee: BTR Industries Ltd., London (GB)

( * ) Notice: Subject to any disclaimer, the term of this patent is extended or adjusted under 35 U.S.C. 154(b) by 0 days.

(21) Appl. No.: 09/331,110

(22) PCT Filed: Dec. 17, 1996

(86) PCT No.: PCT/GB96/03106

§ 371 Date: Aug. 11, 1999

§ 102(e) Date: Aug. 11, 1999

(87) PCT Pub. No.: WO98/27360

PCT Pub. Date: Jun. 25, 1998

(51) Int. Cl.$^7$ ............................................. F16F 5/00
(52) U.S. Cl. .................... 267/141.4; 267/140.13; 267/141.6; 267/294
(58) Field of Search ............... 267/140.13, 141.1, 267/141.4, 141.6, 292, 293, 294

(56) References Cited

U.S. PATENT DOCUMENTS

| | | | | |
|---|---|---|---|---|
| 98,540 | * | 1/1870 | Alden | 267/141 |
| T100,801 | * | 7/1981 | Bianca | 267/141.1 |
| 2,443,201 | * | 6/1948 | Sluyter | 267/1 |
| 2,982,536 | * | 5/1961 | Kordes | 267/1 |
| 3,118,659 | * | 1/1964 | Paulsen | 267/35 |
| 3,134,585 | * | 5/1964 | Trask | 267/1 |
| 3,625,501 | * | 12/1971 | Heln | 267/153 |
| 3,677,535 | * | 7/1972 | Beck | 267/63 |
| 3,684,271 | * | 8/1972 | Arthur | 267/152 |
| 3,920,231 | * | 11/1975 | Harrison et al. | 267/35 |
| 3,929,729 | * | 12/1975 | Chung | 260/75 NH |
| 4,198,037 | * | 4/1980 | Anderson | 267/153 |
| 4,754,958 | * | 7/1988 | Markowski | 267/140 |
| 4,781,365 | * | 11/1988 | Harrison | 267/294 |
| 5,201,500 | * | 4/1993 | Ecktman et al. | 267/140 |
| 5,518,227 | * | 5/1996 | Whelan | 267/153 |
| 5,868,384 | * | 2/1999 | Anderson | 267/141.1 |

FOREIGN PATENT DOCUMENTS

| | | |
|---|---|---|
| 0 143 115 | 6/1985 | (EP) . |
| 0 500 164 | 8/1992 | (EP) . |
| 940 684 | 10/1963 | (GB) . |
| 1 028 892 | 5/1966 | (GB) . |
| 2 158 182 | 11/1985 | (GB) . |
| 2 207 730 | 2/1989 | (GB) . |
| 2 216 984 | 10/1989 | (GB) . |
| 2 258 902 | 2/1993 | (GB) . |
| WO 93/8413 | 4/1993 | (WO) . |

\* cited by examiner

*Primary Examiner*—Robert J. Oberleitner
*Assistant Examiner*—Benjamin A. Pezzlo
(74) *Attorney, Agent, or Firm*—Young & Thompson

(57) ABSTRACT

An elastomeric spring (10) comprises a body (11) of elastomeric material which extends between a pair of opposed end regions (12, 13) whereby compression forces acting in a first direction (16) on said end regions are resisted by compression of the elastomeric body, the body (11) of elastomeric material being of a substantially symmetrical shape as considered in cross section about a major axis (16) of the spring extending in said first direction, and substantially hollow in the vicinity of at least one (13) of said end regions, said body (11) of elastomeric material being of progressively increasing external cross-sectional dimension over a first part (21) of the length of the body extending from a first (32) of said end regions and of progressively decreasing external cross-sectional dimension over a second part (22) of the length of the body extending to a second (13) of said end regions, a substantially inextensible reinforcement member (17) embedded in and bonded to said body (11) of elastomeric material at a position between said first and second parts (21, 22) of the length of the body, the body of elastomeric material being hollow over a distance which extends, in said first direction (16), from said at least one (13) of said end regions to beyond the position at which said reinforcement member (17) lies between the end regions (12, 13), and the body of elastomeric material being of progressively increasing external cross-sectional dimension over a part (24) of the length of the body extending from the reinforcement member (17) to said second part (22).

8 Claims, 5 Drawing Sheets

REINFORCED ELASTOMERIC SPRING

BACKGROUND AND SUMMARY OF THE INVENTION

This invention relates to a spring and in particular, though not exclusively, to an elastomeric spring of a kind which is intended normally to withstand compression load in a first direction between two opposed end regions of the spring whilst permitting a degree of substantially free relative movement between said end regions of the spring in a plane which is generally transverse relative to said first direction.

One known spring of the aforementioned kind is described in the specification of GB-A-2156947.

The ability of a spring to permit substantially free relative movement in a transverse direction usually can be improved by increasing the length of the spring in the first direction, but that requires an increase in the overall space envelope and may not be acceptable. Also the weight of the spring and cost of materials is increased.

The present invention seeks in particular, though not exclusively, to provide a spring which, in comparison with a conventional spring, has an improved ability to permit substantially free relative movement in a transverse direction without any substantial increase in the length of the spring in the direction in which normally it is loaded in compression.

In accordance with the present invention, an elastomeric spring comprises a body of elastomeric material which extends between a pair of opposed end regions, each end region being bonded to a respective one of a pair of rigid end members whereby compression forces acting in a first direction on the rigid end members are resisted by compression of the elastomeric body, the body of elastomeric material being of a substantially symmetrical shape as considered in cross-section about a major axis of the spring extending in the first direction, the body of elastomeric material being substantially hollow in the vicinity of at least one of the end regions, the body of elastomeric material being of progressively increasing external cross-sectional dimension over a first part of the length of the body extending from a first of the end regions, the body comprising a second part which extends to a second of the end regions and the external profile of the body comprising two portions of convex shape as considered in a plane which contains the major axis of the body, a substantially inextensible reinforcement member embedded in and bonded to the body of elastomeric material at a position between said first and second parts of the length of the body and extending radially outwards from the bonded position, and the body of elastomeric material being of a progressively increasing external cross-sectional dimension over a part, hereinafter referred to as a fourth part, of the length of the body extending from the reinforcement member to the second part, the body of elastomeric material being hollow over a distance which extends, in the first direction, from at least one of the end regions to beyond the position at which the reinforcement member lies between the end regions, that part of the body of elastomeric material which lies between the second end region and the reinforcement member having a maximum external dimension which is greater than that of the part of the body between the reinforcement member and the first end region, and the maximum external dimension of the bonded area of the first end region being less than the maximum external dimension of the bonded area of the second end region.

Preferably the substantially inextensible reinforcement member does not form a complete division between elastomeric material of the first and second end regions. Therefore the body of elastomeric material may extend continuously between the end regions.

The reinforcement member may be annular. The body of elastomeric material may be of circular shape in cross-section and the inner boundary of the reinforcement member may have a diameter greater than the inner diameter of the elastomeric body at a transverse plane containing the reinforcement member so that the body surface which defines the hollow is not interrupted by the reinforcement member.

The reinforcement member may be planar, and may be constructed from sheet material such as sheet metal.

The second part of the length of the body optionally may be of progressively decreasing external cross-sectional dimension in a direction from said fourth part to said second of said end regions.

The body of elastomeric material may have a profile which, as considered in a longitudinal cross-section, in a plane containing said major axis, is waisted. The reinforcement member and waisted region may lie at the same axial position between the end regions.

The body of elastomeric material may be of a progressively decreasing external cross-sectional dimension over a third part of the length of the body extending from the first part to the reinforcement member.

Preferably the first part, or first and fourth parts, of progressively increasing diameter occupies at least 50% and more preferably between 60 and 90% of the length of the body.

One or each of the end regions may be bonded to a metal plate.

Preferably the body of elastomeric material is substantially hollow at least at the second end region. The part of the body of elastomeric material lying between the second end region and reinforcement member may have a maximum external dimension which is greater than that of the part of the body between the reinforcement member and the first end region. Thus the maximum outer dimension between the aforementioned second and fourth parts may be greater than that between the first and third parts. The reinforcement member may extend outwards to have an outer boundary which extends outwards from said major axis by a distance at least as great as the maximum external dimension of the body of elastomeric material. The outer boundary of the reinforcement member may extend outwards beyond the maximum external dimension of the elastomeric body by at least 25% of the length of the body. It may extend beyond by at least 50% of the length.

The reinforcement member may be selected in size so as always to extend outwards from the major axis to beyond the elastomeric body, or at least part of the body neighbouring the reinforcement member, when the elastomeric spring is subjected simultaneously to maximum shear and compression loads.

The inner boundary of the reinforcement member may lie radially closer to the major axis of the elastomeric body than the maximum radial extent of the hollow end region of the elastomeric body. The inner boundary may lie radially inwards relative to the maximum radial extent of a bonded area at the first end region of the elastomeric body.

Preferably the body of elastomeric material is substantially hollow over at least 50% and more preferably over at least 70% of the length of the spring. It may be substantially tubular. It may have a closed end region; a vent passage may extend axially through a closed end region to communicate with the hollow cavity.

Preferably the maximum external dimension of the spring as considered in a cross-sectional plane perpendicular to the major axis is at a position where the cross-section of the body is annular, i.e. at a hollow portion.

Preferably, as considered in a plane containing the major axis of the body, the external profile of the body is curved over the first, second and fourth parts and preferably also over any third if provided.

The body of elastomeric material as considered in a cross-sectional plane perpendicular to the major axis preferably is of a generally circular external profile, and also of generally circular internal profile where hollow thereby to result in a spring having substantially uniform load-deflection properties in all transverse directions perpendicular to the major axis. Where, however, non-uniform properties are sought either or both of said internal and external profiles may be non-circular, an elliptical profile being considered particularly useful for many applications.

The body of elastomeric material may comprise two or more substantially inextensible reinforcement members provided at positions spaced apart in said first direction.

An inextensible reinforcement member may be of flexible material, or it may be substantially rigid. It may be formed with a plurality of apertures and moulded elastomeric body material lying either side of the reinforcement member may interconnect through the apertures.

The spring may be used in series with an air spring and may have a through passage comprising the hollow region for the purpose of allowing air to flow to and from the air spring.

With the exception of the substantially inextensible reinforcement member(s) and any rigid end plates the spring per se and an installation incorporating the spring preferably is devoid of structure which restricts deformation of the body of elastomeric material in normal use of the spring.

Two or more of the bodies of elastomeric material may be arranged in series with one another. In this arrangement the end region of one spring may be formed of elastomeric material and said material may be contiguous with the elastomeric material of the end region of the next successive body. Alternatively, for example, a single rigid member may be provided between and bonded to the end faces of two successive bodies of elastomeric material or each of two confronting end regions may comprise a rigid member, means being provided for securing together the two rigid members.

When two bodies are arranged in series, preferably they are arranged with their first end regions in proximity in the case of bodies having first end regions which are closed.

Preferably the hollow portion of the body of elastomeric material defines at least in part a cavity which is at ambient pressure notwithstanding deflection of the spring. Thus when the second of the end regions comprises a rigid plate and the hollow does not extend to the other end, it is preferred that said plate be formed with an opening which is in communication with the hollow cavity thereby to permit the flow of air or other ambient medium to or from the cavity.

Preferably at least when in situ in a suspension the body of elastomeric material is arranged such that when undergoing compression in the first direction the external surface of the body over that part, the second part, which is of progressively decreasing external dimension progressively comes into contact with and is supported by a rigid support member. The rigid support member may be comprised by an outer region of an end plate bonded to the body of elastomeric material or may be independent of said plate.

BRIEF DESCRIPTION OF THE DRAWINGS

Embodiments of the present invention will now be described, by way of example, with reference to the accompanying diagrammatic drawings wherein.

DESCRIPTION OF THE PREFERRED EMBODIMENTS

Figure 1:
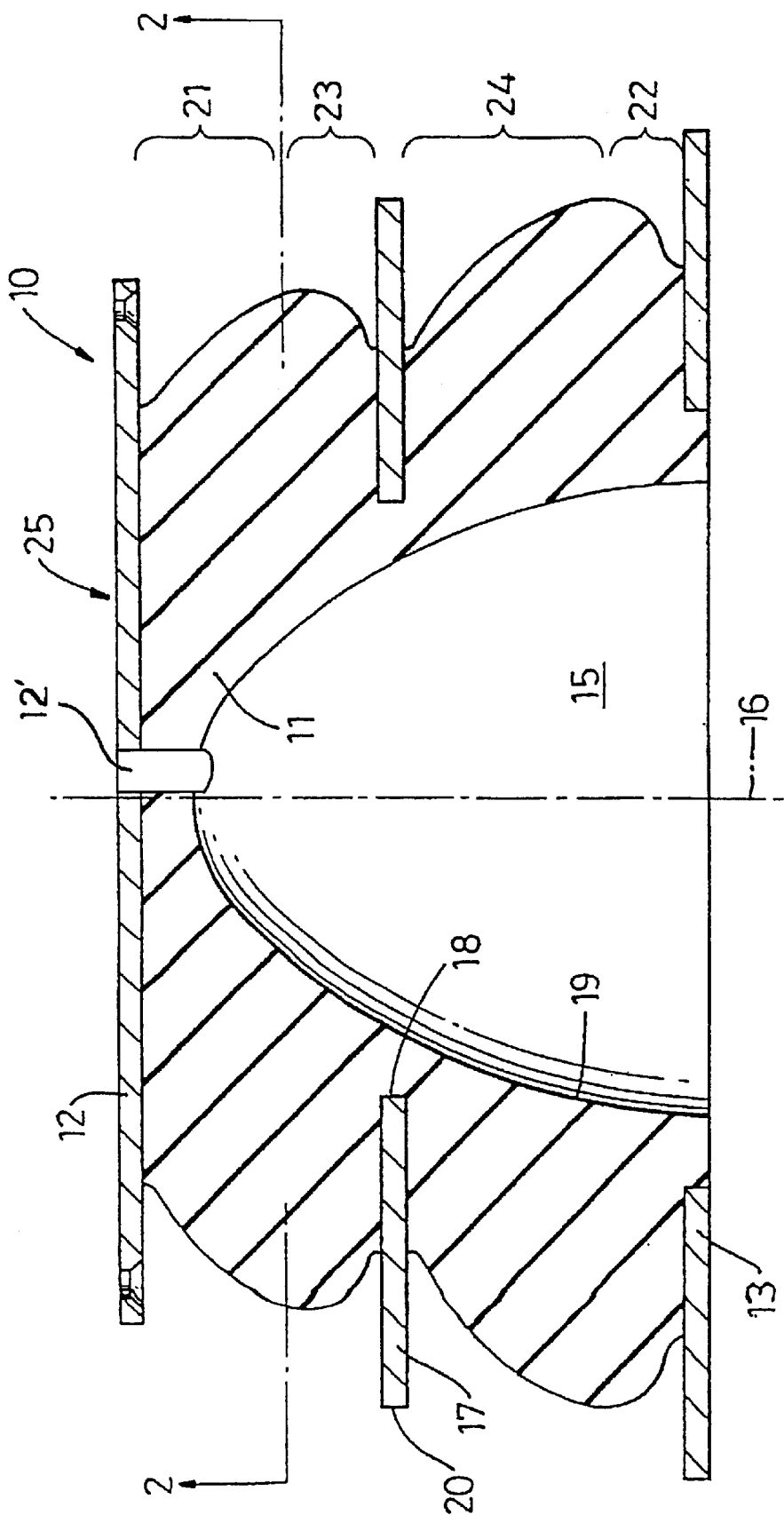
FIG. 1 is a sectional view of a spring in accordance with the present invention in an unloaded condition.
Figure 2:
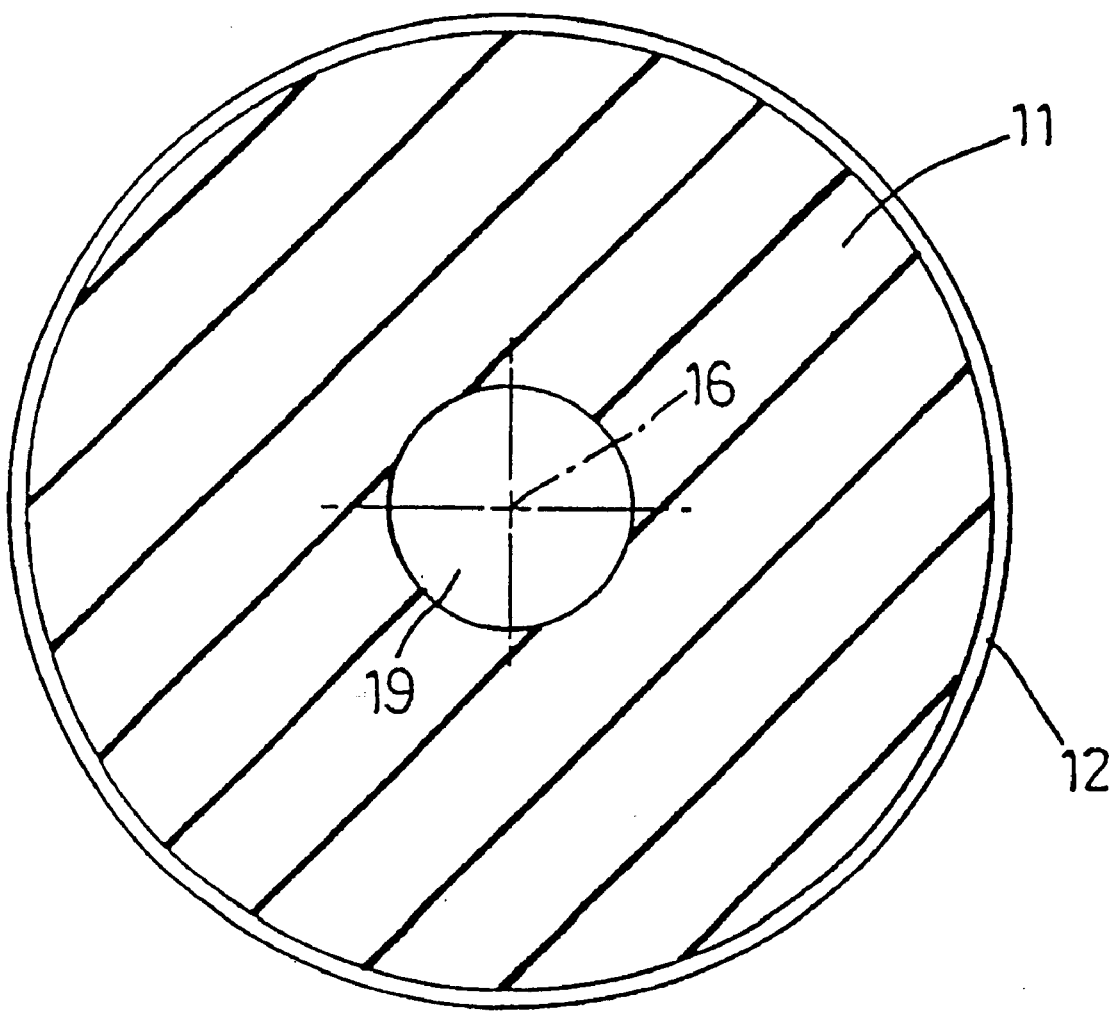
FIG. 2 is a cross-sectional view on the line 2—2 of FIG. 1.

A spring 10 comprises a body 11 of elastomeric material of generally circular cross-sectional shape and located between and bonded to metal end plates 12,13.

The body 11 has a hollow internal cavity 15 which extends over approximately 90% of the length of the spring in the direction of the major compression axis 16 about which the body 11 is symmetrical. The cavity 15 extends from a second of the rigid end plates 13, which is of an annular shape, and progressively reduces in cross-section to the closed end near the first end plate 12.

An inextensible and substantially rigid annular metal reinforcement plate 17 is embedded in the body 11 and lies symmetrically positioned about the major axis 16, in a transverse plane which is perpendicular to that axis.

The reinforcement plate 17 has an inner boundary 18 of a larger diameter than that of the cavity 15 in the transverse plane of the plate so that the elastomeric material extends continuously between opposite sides of the plate. The inner surface 19 of the body defining the cavity therefore is uninterrupted by the plate 17.

The reinforcement plate has an outer boundary 20 which lies outwards of the elastomeric material bonded to either side of the plate. The outer boundary has a diameter which at the least corresponds to the maximum outer diameter of the body 11.

The body 11 of elastomeric material has, adjacent the first end plate 12, a first part 21 of progressively increasing diameter as considered in a direction away from the first end plate 12 towards the second end plate 13. A second part 22 of progressively decreasing diameter extends, in said direction, to contact the second end plate 13.

The first part 21 of the length of the body is separated from the reinforcement plate 17 by a third part 23 of progressively decreasing diameter as considered in the direction from the first to the second end plate.

The second part 22 of the length of the body is separated from the reinforcement plate 17 by a fourth part 24 of progressively increasing diameter, also as considered in the direction from the first to the second end plate.

The outer region of the first plate 12 provides an abutment surface for the outer surface of the first part 21 of the body 11 when the spring is compressed axially along the axis 16. Similarly the respective sides of the reinforcement plate 17 provide abutment surfaces for the third and fourth parts 23,24 of the body and the second end plate 13 provides an abutment for the second part 22 of the body.

A vent passage 12' may be provided in the axial end region 25, to extend in the direction of axis 16 through the body 11 and plate 12.

Figure 3:
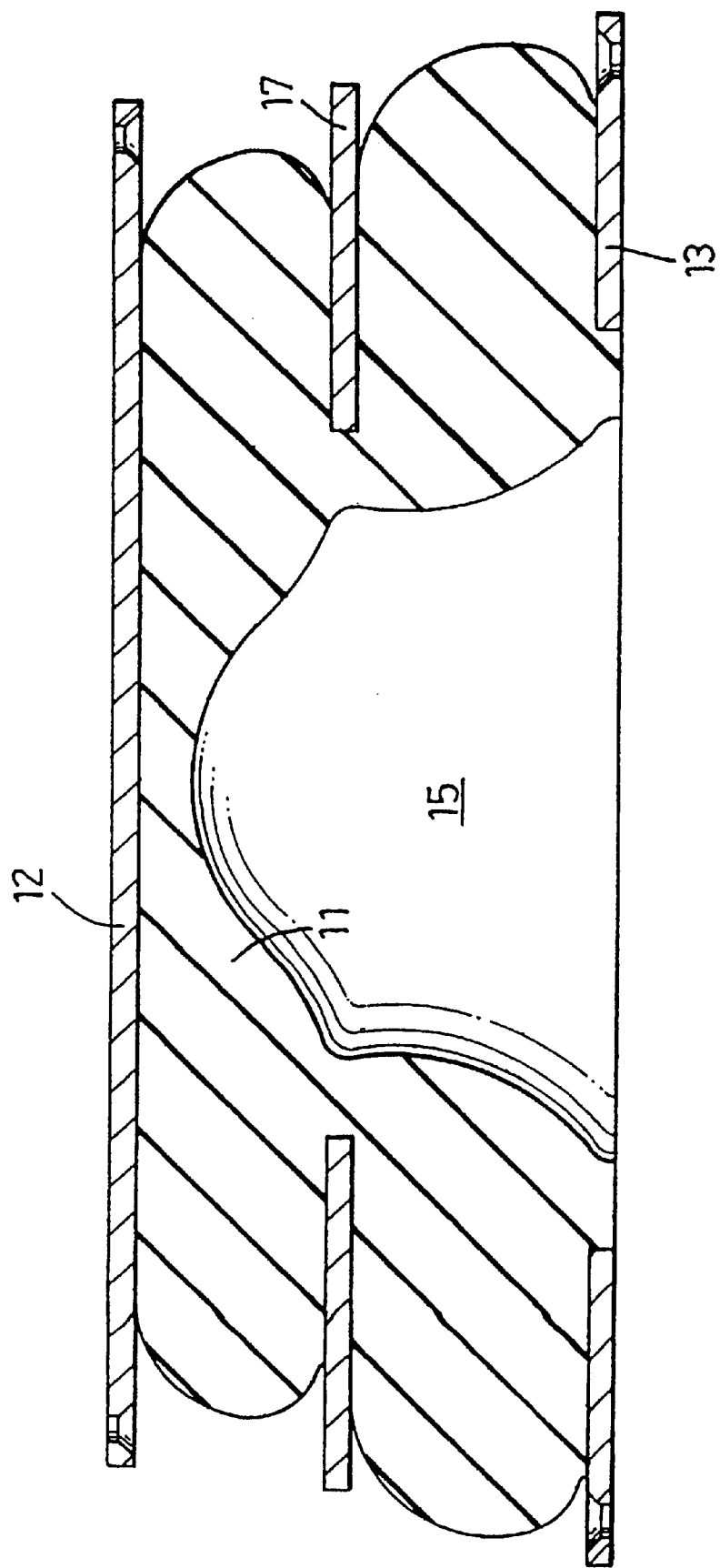
FIG. 3 is a view similar to that of FIG. 1 showing the spring under compression.

FIG. 3 shows the spring in compression and with the end and reinforcement plates 12,13,17 providing support for respective parts of the external surface regions of the elastomeric body 11.

Provision of the reinforcement plate 17 is found to give the spring a surprisingly good ability to accommodate relative transverse movement between its ends as compared with a conventional spring of similar compression loading capability. Conversely, as compared with a conventional spring having a similar capability for transverse flexibility, a spring in accordance with the present invention is able to withstand a greater compression loading, or may be of shorter length.

Figure 4:
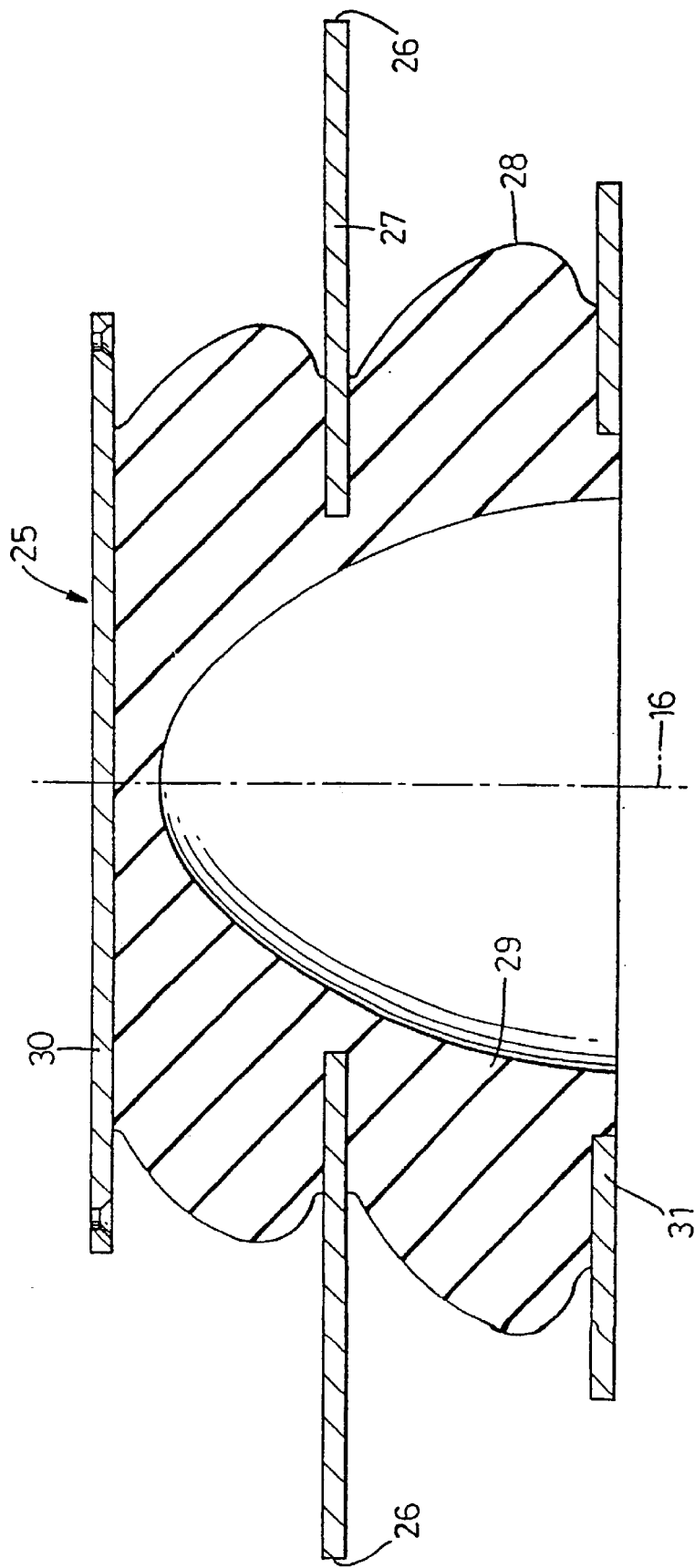
FIGS. 4 and 5 are sectional views of springs in accordance with two other embodiments of the invention.

FIG. 4 shows a spring 25 in accordance with a second embodiment of the invention. It is constructed substantially similar to that shown in FIG. 1 except that the outer boundary 26 of the reinforcement plate 27 lies outwards of the region 28 of maximum diameter of the body 29 by a distance which is 50% of the length of the body between the end plates 30,31.

Figure 5:
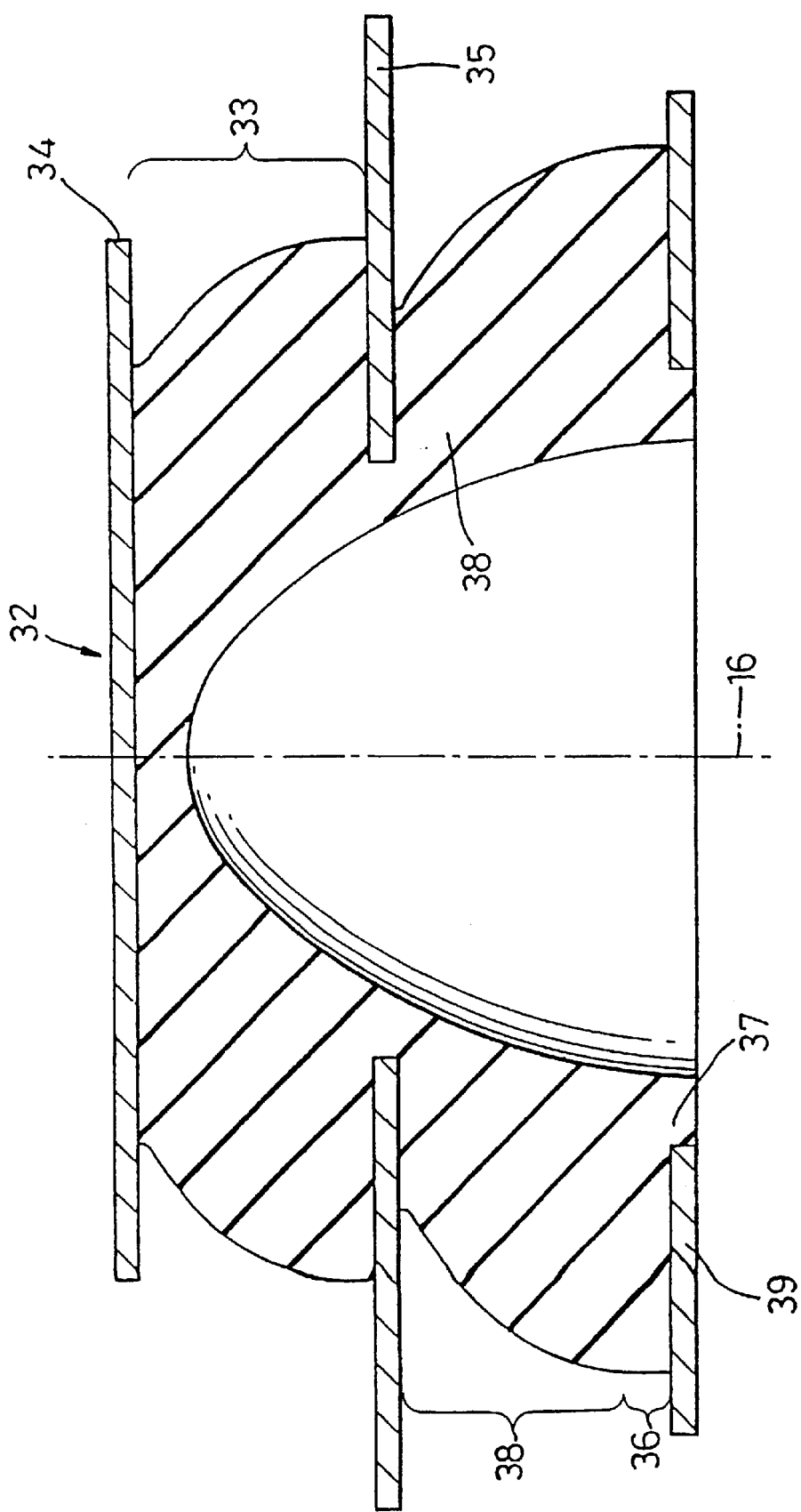

FIG. 5 shows another embodiment in which a spring 32 omits the third body part 23 of FIG. 1. In this embodiment the first part 33 of the body extends the full distance from one end plate 34 to the reinforcement plate 35. The embodiment of FIG. 5 also differs from the preceding embodiments in that the second part 36 is not of a progressively decreasing external cross-sectional dimension in a direction towards the second end region 37. The second part 36 is substantially cylindrical in shape, and the fourth part 38 occupies most of the axial length between the reinforcement plate 35 and the second end plate 39.

Springs in accordance with the present invention are particularly suitable for use in vehicle suspensions such as, for example, a vehicle suspension of the kind the subject of our UK Patent Application No. 8408167.

A spring of a kind in accordance with the present invention is suitable for use within the chamber of an air spring, such as that described in the aforesaid Application, for the purpose of providing support in the event of partial or complete depressurisation of the air chamber. A spring in accordance with the present invention additionally may be employed external of an air spring, in series therewith to withstand the compression load to which the vehicle suspension is subject during normal usage.

What is claimed is:

1. An elastomeric spring comprising:

a body of elastomeric material that has opposing end regions and that is generally symmetrical about a longitudinal axis;

a first rigid end member that is bonded to a first of the opposing end regions and a second rigid end member that is bonded to a second of the opposing end regions, said second end member being annular, a compressive force acting parallel to the longitudinal axis on said end members being resisted by said body; and a substantially inextensible reinforcement member embedded in and bonded to said body at a position between the opposing end regions and extending radially outwards from the bonded position, said reinforcement member being annular and only partially dividing the elastomeric material between the opposing end regions, said body having an external profile comprising two convex portions, a first of said convex portions being between said reinforcement member and said first end member and a second of said convex portions being between said reinforcement member and said second end member, a maximum external dimension of said first convex portion being less than a maximum external dimension of said second convex portion, said body being waisted at said reinforcement member;

said body having an interior wall defining a hollow region that extends through said second end member, said second end region, and said reinforcement member, to near said first end region, wherein when a compressive force is not acting on the spring, said interior wall has a generally semi-elliptical shape in cross section with a progressively decreasing cross section dimension from said second end region to near said first end region where said interior wall has a closed end, and wherein when a compressive force is acting on the spring, said interior wall has, in cross section, a first convex shape between a position corresponding to said second end member and a position corresponding to said reinforcement member, a first concave shape at the position corresponding to said reinforcement member, and a second convex shape between said first concave shape and a position near the closed end, the closed end being flatter than when the compressive force is not acting on the spring.

2. The spring of claim 1, wherein said body has substantially the same thickness at said reinforcement member and at said second end member when measured from said interior wall radially outwardly to an exterior of said body.

3. The spring of claim 2, wherein said body is thicker at said first convex portion than at said second convex portion when measured from said interior wall radially outwardly to an exterior of said body at the respective maximum external dimension.

4. The spring of claim 1, wherein said second end member has a greater external diameter than said reinforcement member, which has a greater external diameter than said first end member.

5. The spring of claim 1, wherein said second end member has a greater external diameter than said first end member, and wherein said reinforcement member has a greater external diameter than both said first and second end members.

6. The spring of claim 1, wherein the hollow region extends at least 90% of a longitudinal dimension of the spring.

7. The spring of claim 6, wherein a longitudinal distance between said first end member and said reinforcement member is less than a longitudinal distance between said second end member and said reinforcement member.

8. The spring of claim 1, wherein said hollow region has a first diameter at the position corresponding to said second end member and a second diameter at the position corresponding to said reinforcement member, said first diameter being greater than said second diameter regardless of whether the compressive force is applied to the spring.

* * * * *